United States Patent
Muldoon et al.

(10) Patent No.: US 12,065,974 B2
(45) Date of Patent: Aug. 20, 2024

(54) DOUBLE SPLINED COUPLING FOR A TURBINE ENGINE

(71) Applicant: Raytheon Technologies Corporation, Farmington, CT (US)

(72) Inventors: Marc J. Muldoon, Marlborough, CT (US); Russell B. Witlicki, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/967,402

(22) Filed: Oct. 17, 2022

(65) Prior Publication Data

US 2023/0122524 A1    Apr. 20, 2023

Related U.S. Application Data (60) Provisional application No. 63/256,348, filed on Oct. 15, 2021.

(51) Int. Cl.
| | |
|---|---|
| *F02C 7/36* | (2006.01) |
| *F01D 15/10* | (2006.01) |
| *F02C 7/28* | (2006.01) |
| *F16D 3/18* | (2006.01) |

(52) U.S. Cl.
CPC ............... *F02C 7/36* (2013.01); *F01D 15/10* (2013.01); *F02C 7/28* (2013.01); *F05D 2260/36* (2013.01); *F05D 2260/40311* (2013.01)

(58) Field of Classification Search
None
See application file for complete search history.

(56) References Cited

U.S. PATENT DOCUMENTS

| | | | |
|---|---|---|---|
| 2,707,865 A | 5/1955 | Huebner, Jr. | |
| 4,061,216 A * | 12/1977 | Sullivan | F16D 41/12 192/85.53 |
| 7,065,954 B2 * | 6/2006 | Labala | F16C 33/6677 184/6.12 |
| 8,167,727 B2 * | 5/2012 | Anema | F16D 3/185 464/16 |
| 9,018,821 B2 | 4/2015 | Stiesdal | |

(Continued)

FOREIGN PATENT DOCUMENTS

| | | |
|---|---|---|
| EP | 3544152 B1 | 10/2020 |
| JP | 2002054651 A | 2/2002 |
| WO | 2020084241 A1 | 4/2020 |

OTHER PUBLICATIONS

"American National Standard Design Manual for Enclosed Epicyclic Gear Drives", ANSI/AGMA 6023-A88, Nov. 1988.
EP search report for EP22201989.5 dated Mar. 9, 2023.

*Primary Examiner* — Kayla Mccaffrey
(74) *Attorney, Agent, or Firm* — Getz Balich LLC (57) ABSTRACT

An assembly is provided for a turbine engine. This turbine engine assembly includes a turbine engine shaft, a gearbox and a coupler. The turbine engine shaft is configured to rotate about a rotational axis. The gearbox includes a gear configured to rotate about the rotational axis. The coupler is coupled to the turbine engine shaft by a coupler-shaft connection. The coupler-shaft connection is configured as or otherwise includes a crowned spline connection. The coupler is coupled to the gear by a coupler-gear connection. The coupler-gear connection is configured as or otherwise includes a crowned spline connection.

20 Claims, 10 Drawing Sheets

(56) References Cited

U.S. PATENT DOCUMENTS

| | | |
|---|---|---|
| 9,917,490 B2 | 3/2018 | Lemmers |
| 10,071,811 B2 | 9/2018 | Kupiszewski |
| 10,308,366 B2 | 6/2019 | Kupiszewski |
| 10,487,839 B2 | 11/2019 | Kupiszewski |
| 10,801,410 B2 | 10/2020 | Roberge |
| 11,085,515 B2 | 8/2021 | Moniz |
| 2011/0081975 A1 | 4/2011 | Anema |
| 2019/0085715 A1 | 3/2019 | Van Der Merwe |
| 2020/0063606 A1 | 2/2020 | Miller |
| 2021/0010382 A1 | 1/2021 | Davies |
| 2021/0010383 A1 | 1/2021 | Bradley |
| 2021/0010384 A1 | 1/2021 | Bradley |
| 2021/0079850 A1 | 3/2021 | Davies |
| 2021/0087977 A1 | 3/2021 | Becoulet |

* cited by examiner

DOUBLE SPLINED COUPLING FOR A TURBINE ENGINE

This application claims priority to U.S. Patent Appln. No. 63/256,348 filed Oct. 15, 2021 which is hereby incorporated herein by reference in its entirety.

BACKGROUND OF THE DISCLOSURE

1. Technical Field

This disclosure relates generally to a turbine engine and, more particularly, to a coupler for connecting a plurality of rotating components within the turbine engine.

2. Background Information

A gas turbine engine may include an electric machine for providing mechanical power and/or electricity. The electric machine is typically connected to a gearbox outside of a core of the engine, where the gearbox is coupled with a rotor within the engine core via a tower shaft. Some efforts have been made to arrange the electric machine within the engine core to reduce overall size of the gas turbine engine. There is a need in the art, however, for structures and components which facilitate arrangement of the electric machine within the engine core. In particular, there is a need in the art for structures and components which facilitate coupling a rotating component of the electric machine or a gearbox for the electric machine with a turbine engine shaft.

SUMMARY OF THE DISCLOSURE

According to an aspect of the present disclosure, an assembly is provided for a turbine engine. This turbine engine assembly includes a turbine engine shaft, a gearbox and a coupler. The turbine engine shaft is configured to rotate about a rotational axis. The gearbox includes a gear configured to rotate about the rotational axis. The coupler is coupled to the turbine engine shaft by a coupler-shaft connection. The coupler-shaft connection is configured as or otherwise includes a crowned spline connection. The coupler is coupled to the gear by a coupler-gear connection. The coupler-gear connection is configured as or otherwise includes a crowned spline connection.

According to another aspect of the present disclosure, another assembly is provided for a turbine engine. This turbine engine assembly includes a first turbine engine component, a second turbine engine component and a coupler. The first turbine engine component is configured to rotate about a rotational axis. The second turbine engine component is configured to rotate about the rotational axis. The coupler includes a splined shaft and a splined element removably mounted to the splined shaft. The splined shaft is coupled to the first turbine engine component by a first crowned spline connection. The splined element is coupled to the second turbine engine component by a second crowned spline connection. The coupler is configured to pivot relative to the first turbine engine component and/or the second turbine engine component.

According to still another aspect of the present disclosure, another assembly is provided for a turbine engine. This turbine engine assembly includes a splined shaft and a splined element. The splined shaft includes a base and a rim. The base extends axially along a rotational axis between a first end and a second end. The rim is disposed at the second end and projects radially out from the base. The rim includes a plurality of second crowned splines arranged circumferentially about the rotational axis at an outer periphery of the rim. The splined element is coupled to the base by a splined connection. The splined element is disposed at the first end. The splined element includes a plurality of first crowned splines arranged circumferentially about the rotational axis at an outer periphery of the splined element. The splined element is axially spaced from the rim.

The turbine engine assembly may also include a plurality of retainers axially fixing the splined element to the base.

The turbine engine assembly may also include a seal land mounted to the splined shaft axially between the rim and the splined element.

A radius of the outer periphery of the rim may be different than a radius of the outer periphery of the splined element.

The first turbine engine component may be configured as or otherwise include a gear within a gearbox. In addition or alternatively, the second turbine engine component may be configured as or otherwise include a shaft.

The turbine engine shaft may include a plurality of shaft splines. The coupler may include a plurality of crowned coupler splines meshed with the plurality of shaft splines.

The gear may include a plurality of gear splines. The coupler may include a plurality of crowned coupler splines meshed with the plurality of gear splines.

The coupler may include a splined shaft and a splined element attached to the splined shaft. The splined shaft may be coupled to the gear by the coupler-gear connection. The splined element may be coupled to the turbine engine shaft by the coupler-shaft connection.

The splined element may be attached to the splined shaft by an element-shaft connection. The element-shaft connection may be configured as or otherwise include a spline connection.

The splined shaft may include a base and a rim that projects radially out from and circumscribes the base. The rim may be coupled to the gear by the coupler-gear connection. The base may project through a bore of the splined element.

The turbine engine assembly may also include a seal assembly that includes a seal land and a seal element. The seal land may be mounted on the splined shaft and disposed axially between the coupler-shaft connection and the coupler-gear connection. The seal element may be arranged with a case of the gearbox.

The coupler may include a splined shaft and a splined element attached to the splined shaft. The splined shaft may be coupled to the turbine engine shaft by the coupler-shaft connection. The splined element may be coupled to the gear by the coupler-gear connection.

The coupler may be configured as or otherwise include a flexible coupling disposed axially between the coupler-shaft connection and the coupler-gear connection.

The turbine engine assembly may also include a bladed turbine rotor connected to the turbine engine shaft.

The turbine engine assembly may also include a bladed compressor rotor connected to the turbine engine shaft.

The turbine engine assembly may also include an electric machine which includes a rotor and a stator. The gearbox may couple the coupler with the rotor.

The electric machine may be configurable as a motor during a motor mode of operation. The electric machine may also or alternatively be configurable as a generator during a generator mode of operation.

The turbine engine assembly may also include a compressor section, a combustor section, a turbine section and a flowpath extending sequentially through the compressor section, the combustor section and the turbine section. The gearbox may be radially inboard of the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
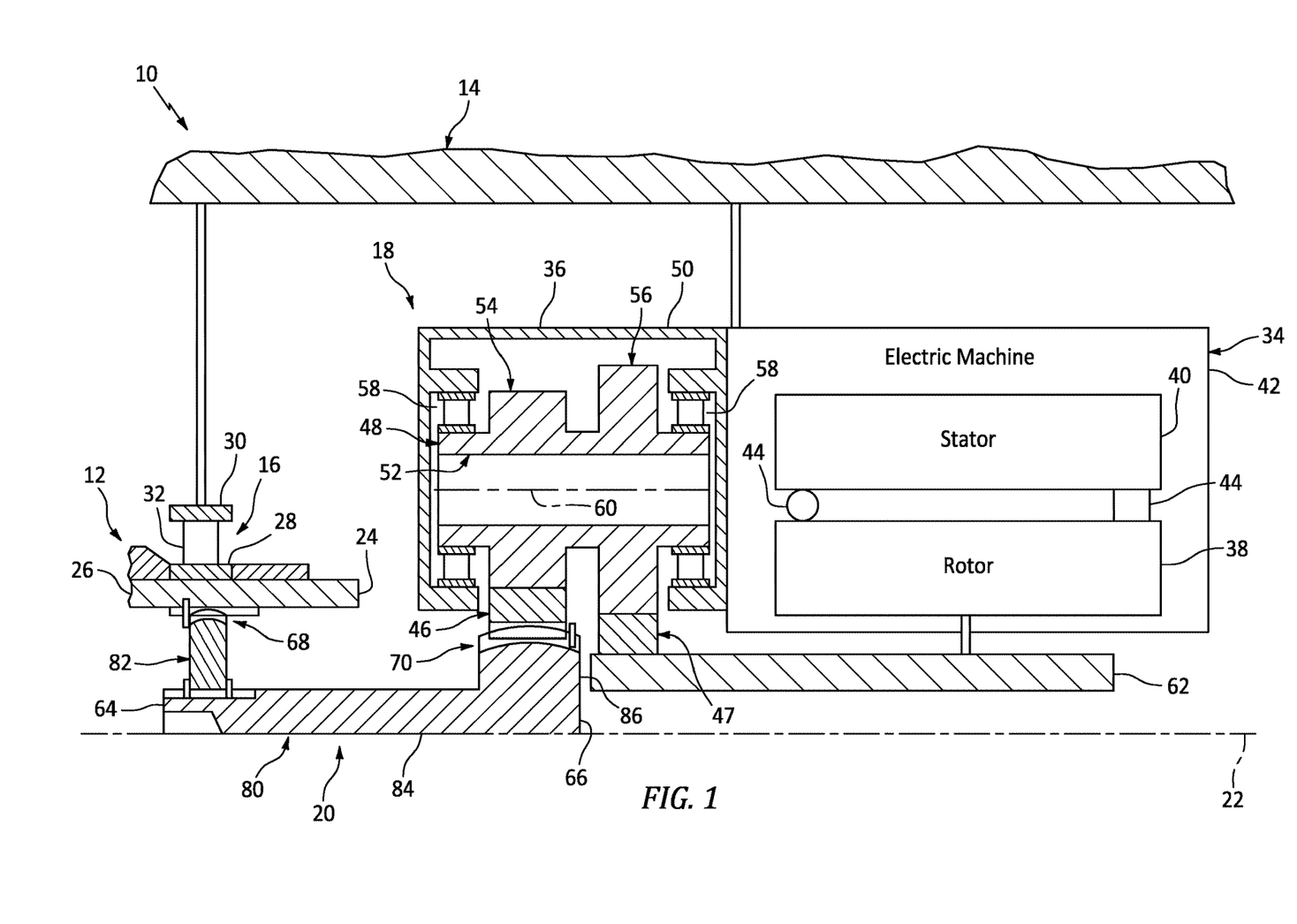
FIG. 1 is a partial sectional illustration of an assembly for a turbine engine.

FIG. 1 illustrates an assembly 10 for a turbine engine. This turbine engine assembly 10 includes a rotating structure 12, a stationary structure 14 and at least one rotating structure bearing 16 that rotatably mounts the rotating structure 12 to the stationary structure 14. The turbine engine assembly 10 also includes a turbine engine apparatus 18 (e.g., a removable and/or self-contained module) and a component coupler 20 (e.g., a double splined coupler, a double articulation quill shaft) that couples the rotating structure 12 with a component of the turbine engine apparatus 18.

The rotating structure 12 extends axially along a rotational axis 22 to a distal end 24 of the rotating structure 12, which rotational axis 22 may be an axial centerline of the turbine engine assembly 10. The rotating structure 12 extends circumferentially around and is rotatable about the rotational axis 22. The rotating structure 12 may be configured as or otherwise include any rotatable component or assembly of rotatable components within the turbine engine. The rotating structure 12 of FIG. 1, for example, is configured as a turbine engine shaft 26. However, this rotating structure 12 may also include one or more additional elements such as, but not limited to, sleeves, spacers, rotors, seal elements, etc. Furthermore, while the turbine engine shaft 26 may be configured as a single monolithic body, the turbine engine shaft 26 may alternatively include a plurality of interconnected shafts/shaft segments.

The stationary structure 14 may be configured as or otherwise include any stationary (e.g., static, non-rotating) component or assembly of stationary components within the turbine engine. The stationary structure 14, for example, may include a turbine engine case and one or more internal support structures within and connected to the turbine engine case.

The structure bearing 16 may be configured as a rolling element bearing. The structure bearing 16 of FIG. 1, for example, includes a bearing inner race 28, a bearing outer race 30 and a plurality of bearing rolling elements 32. The inner race 28 is connected (e.g., fixedly mounted) to the rotating structure 12 and its turbine engine shaft 26. The outer race 30 is connected (e.g., fixedly mounted) to the stationary structure 14. The rolling elements 32 are arranged circumferentially about the rotational axis 22 in an array. The rolling elements 32 are disposed radially between and engaged with the inner race 28 and the outer race 30. With this arrangement, the structure bearing 16 is configured to rotatably mount the rotating structure 12 and its turbine engine shaft 26 to the stationary structure 14.

The turbine engine apparatus 18 may be configured as an electric machine system. The turbine engine apparatus 18 of FIG. 1, for example, includes an electric machine 34 and a gearbox 36.

The electric machine 34 is configurable as an electric motor and/or an electric generator. For example, during a motor mode of operation, the electric machine 34 may operate as the electric motor to convert electricity (e.g., received from a battery and/or another electricity source) into mechanical power; e.g., torque. This mechanical power may be utilized for various purposes within the turbine engine such as, for example, rotating the rotating structure 12 during turbine engine startup. During a generator mode of operation, the electric machine 34 may operate as the electric generator to convert mechanical power (e.g., received through the rotating structure 12) into electricity. This electricity may be utilized for various purposes within the turbine engine such as, for example, electrically powering one or more electric components of the turbine engine and/or charging the battery. The electricity may also or alternatively be utilized for various purposes outside of the turbine engine such as, for example, electrically powering one or more electrical components in an aircraft.

The electric machine 34 includes an (e.g., annular) electric machine rotor 38 and an (e.g., annular) electric machine stator 40. The electric machine 34 also includes an electric machine case 42 that at least partially or completely houses and/or supports the machine rotor 38 and/or the machine stator 40. The machine rotor 38 is configured to move relative to (e.g., rotate within or about) the machine stator 40 to convert electricity into mechanical power or convert mechanical power into electricity depending upon the mode of electric machine operation. The machine rotor 38, for example, may be rotatably mounted within the electric machine 34 to a stationary portion of the electric machine 34 (e.g., the machine case 42 and/or the machine stator 40) via one or more internal electric machine bearings 44; e.g., rolling element bearings. The machine stator 40 is connected (e.g., fixedly mounted) to the machine case 42, and the machine case 42 is connected (e.g., fixedly mounted) to the stationary structure 14.

Figure 1B:
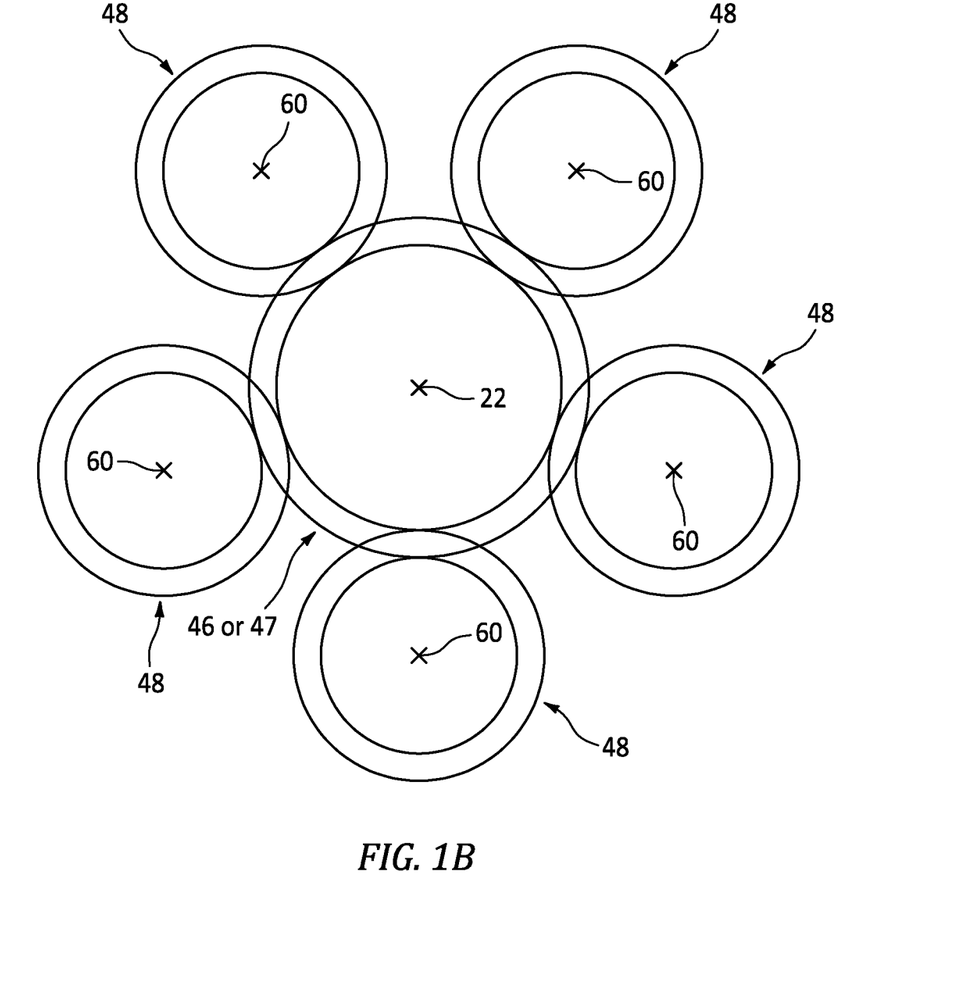
FIG. 1B is a schematic illustration of a gearbox.

The gearbox 36 of FIG. 1 includes a gearbox first gear 46 (e.g., a sun gear), a gearbox second gear 47 (e.g., a sun gear) and one or more gearbox idlers 48 (see also FIG. 1B) (e.g., star gear-shafts), which gearbox idlers 48 are distributed circumferentially about the rotational axis 22 in an array. The gearbox 36 of FIG. 1 also includes a gearbox case 50 that at least partially or completely houses and/or supports one or more of the gearbox elements 46-48.

The gearbox first gear 46 and the gearbox second gear 47 are rotatable about the rotational axis 22. The gearbox first gear 46 is axially spaced from the gearbox second gear 47 along the rotational axis 22.

Each of the gearbox idlers 48 of FIG. 1 includes an idler base 52 (e.g., a shaft), an idler first gear 54 (e.g., a star gear) and an idler second gear 56 (e.g., a star gear). Each gearbox idler 48 and its base 52 are rotatably mounted to the gearbox case 50 by one or more internal gearbox bearings 58; e.g., rolling element bearings. Each gearbox idler 48 and its base 52 of FIG. 1 are rotatable about an idler (e.g., gear-shaft) rotational axis 60 of the gearbox idler 48 (e.g., gear-shaft), which rotational axis 60 is parallel with and radially offset from the rotational axis 22. The first gear 54 and the second gear 56 are connected to the base 52. The first gear 54 is axially spaced from the second gear 56 along the rotational axis 60.

The first gear 54 is mated with the gearbox first gear 46. More particularly, exterior gear teeth of the first gear 54 are meshed with exterior gear teeth of the gearbox first gear 46. Similarly, the idler second gear 56 is mated with the gearbox second gear 47. More particularly, exterior gear teeth of the second gear 56 are meshed with exterior gear teeth of the gearbox second gear 47. Each gearbox idler 48 (e.g., gear-shaft) thereby couples and transmits torque between the gearbox first gear 46 and the gearbox second gear 47, where the gearbox second gear 47 of FIG. 1 is coupled to the electric machine 34 and its machine rotor 38 by an inter-gearbox-machine coupler 62.

The gearbox 36 of FIG. 1 is configured as a speed change device between the rotating structure 12 and the electric machine 34 and its machine rotor 38. For example, the gearbox first gear 46 is configured with an outer diameter that is different (e.g., greater) than an outer diameter of the gearbox second gear 47. The first gear 54 is also (or alternatively) configured with an outer diameter that is different (e.g., less) than an outer diameter of the second gear 56. With this arrangement, the gearbox 36 of FIG. 1 may be configured as a speed change device. The gearbox 36 of FIG. 1, for example, may be configured as a speed reduction device when, for example, the electric machine 34 and its machine rotor 38 drive the rotating structure 12. However, in other embodiments, the gearbox elements 46-48 may alternatively be configured such that the gearbox 36 is a speed reduction device as the rotating structure 12 drives the electric machine 34 and its machine rotor 38.

The component coupler 20 extends axially along the rotational axis 22 between and to a first end 64 of the component coupler 20 and a second end 66 of the component coupler 20. The component coupler 20 is rotatable about the rotational axis 22. The component coupler 20 is coupled to the rotating structure 12 and its turbine engine shaft 26 by a compliant coupler-shaft connection 68 at (e.g., on, adjacent or proximate) the coupler first end 64. The component coupler 20 is thereby configured to rotate with the rotating structure 12 and its turbine engine shaft 26 about the rotational axis 22. The component coupler 20 is coupled to the gearbox 36 and its gearbox first gear 46 by a compliant coupler-gear connection 70 at the coupler second end 66. The component coupler 20 is thereby configured to rotate with the gearbox first gear 46 about the rotational axis 22.

Figure 2:
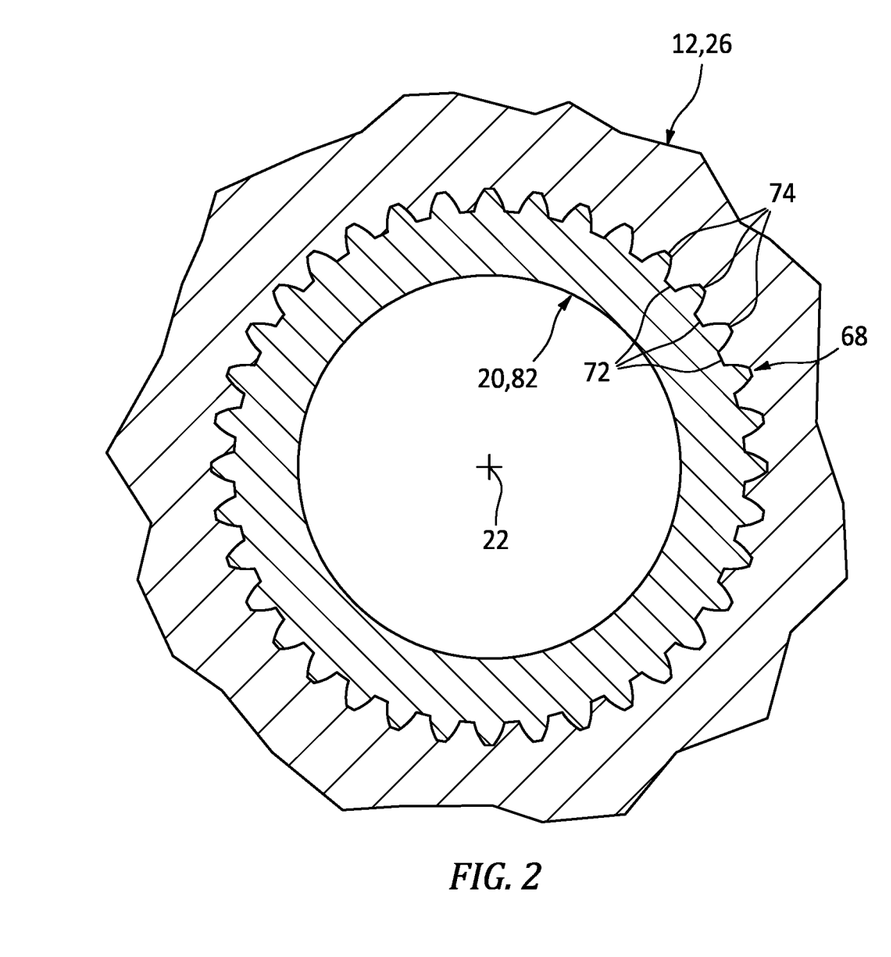
FIG. 2 is a partial cross-sectional illustration of at a spline connection between a rotating structure and a coupler.

The coupler-shaft connection 68 of FIG. 1 is configured as a crowned spline connection. The rotating structure 12 and its turbine engine shaft 26 of FIG. 2, for example, includes a plurality of (e.g., internal) shaft splines 72 (e.g., ribs, teeth, etc.), and the component coupler 20 includes a plurality of (e.g., external) first coupler splines 74 (e.g., ribs, teeth, etc.) at the coupler first end 64 (see FIG. 1). The shaft splines 72 are arranged circumferentially about the rotational axis 22 in an annular array, and the first coupler splines 74 are arranged circumferentially about the rotational axis 22 in an annular array. The shaft splines 72 are meshed with the first coupler splines 74. The shaft splines 72 of FIG. 2, for example, are interspersed with the first coupler splines 74, and the first coupler splines 74 are interspersed with the shaft splines 72. More particularly, each shaft spline 72 projects radially (e.g., inward) into a respective first coupler groove in the component coupler 20, where the first coupler groove is formed by and circumferentially between a circumferentially neighboring (e.g., adjacent) pair of the first coupler splines 74. Similarly, each of the first coupler splines 74 projects radially (e.g., outward) into a respective shaft groove in the rotating structure 12 and its turbine engine shaft 26, where the shaft groove is formed by and circumferentially between a circumferentially neighboring pair of the shaft splines 72. With this arrangement, the component coupler 20 may slightly move (e.g., axially translate) relative to the rotating structure 12 and its turbine engine shaft 26 during turbine engine operation.

Figure 3A:
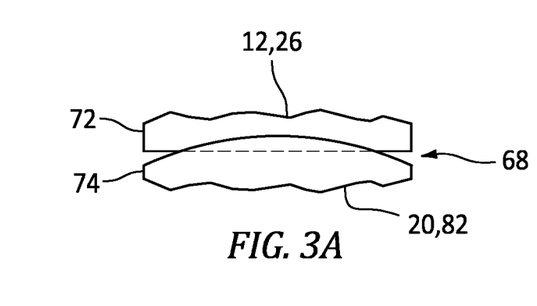
FIGS. 3A-E are partial illustrations of various arrangements for the spline connection between the rotating structure and the coupler.
Figure 3B:
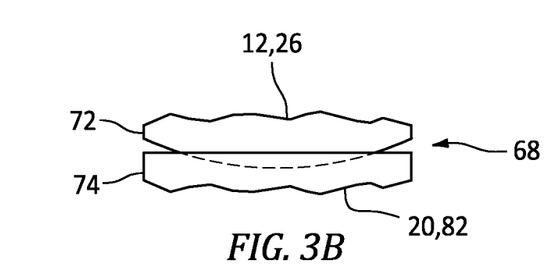
Figure 3C:
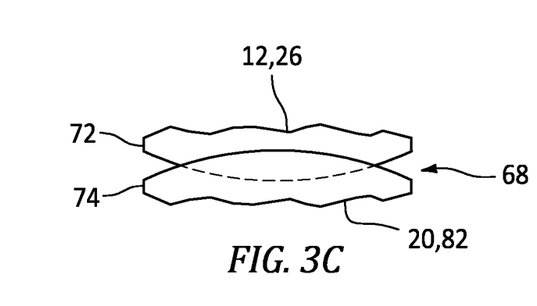
Figure 3D:
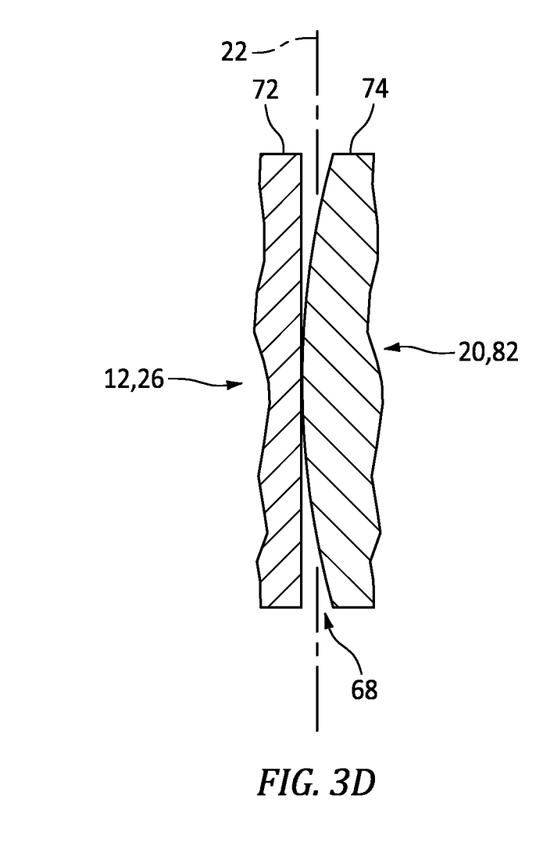
Figure 3E:
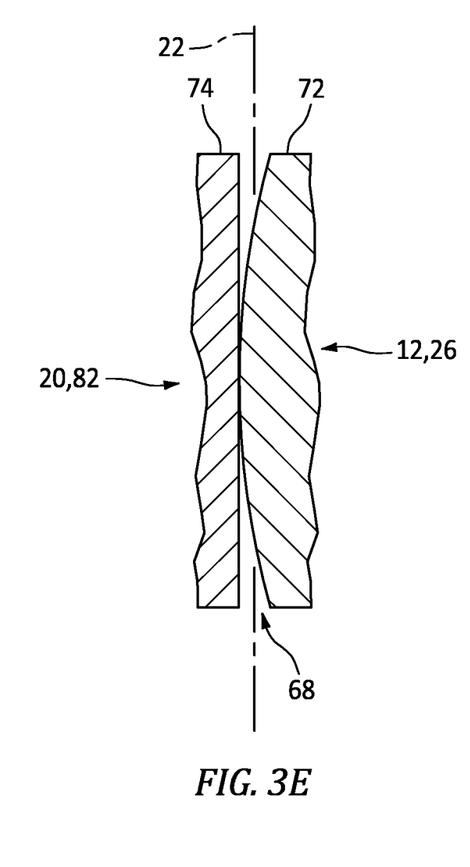

The crowned spline connection FIG. 3A is configured as a single crowned spline connection where the first coupler splines 74 are crowned splines and the shaft splines 72 are non-crowned (e.g., rectangular, straight) splines. Each first coupler spline 74 of FIG. 3A, for example, has a convex (e.g., curved, arcuate, etc.) tip profile when viewed, for example, in a reference plane parallel with and/or coincident with the rotational axis 22 (see FIG. 1). Each shaft spline 72 of FIG. 3A, by contrast, has a straight tip profile when viewed, for example, in the reference plane. In other embodiments however, referring to FIG. 3B, the shaft splines 72 may be crowned splines and the first coupler splines 74 may be non-crowned (e.g., rectangular, straight) splines. In still other embodiments, referring to FIG. 3C, the crowned spline connection may be configured as a double crowned spline connection where both the first coupler splines 74 and the shaft splines 72 are crowned splines. In addition to or as an alternative to the profiles of FIGS. 3A-C, each of the splines 74 of FIG. 3D has a convex (e.g., curved, arcuate, etc.) flank side profile when viewed, for example, in a second reference plane parallel with and radially spaced from the rotational axis 22. Each of the splines 72 of FIG. 3D, by contrast, may be configured with a straight flank side profile when viewed, for example, in the second reference plane. In another example, each of the splines 72 of FIG. 3E has a convex (e.g., curved, arcuate, etc.) flank side profile when viewed, for example, in the second reference plane. Each of the splines 74 of FIG. 3E, by contrast, may be configured with a straight flank side profile when viewed, for example, in the second reference plane.

The crowned spline connections of FIGS. 3A-E may accommodate additional (e.g., more than just axial) movement between the component coupler 20 and the rotating structure 12 and its turbine engine shaft 26 of FIG. 1. The crowned spline connections of FIGS. 3A-E, for example, may accommodate slight axial mis-alignment (e.g., pivoting) between the component coupler 20 and the rotating structure 12 and its turbine engine shaft 26 of FIG. 1.

Figure 4:
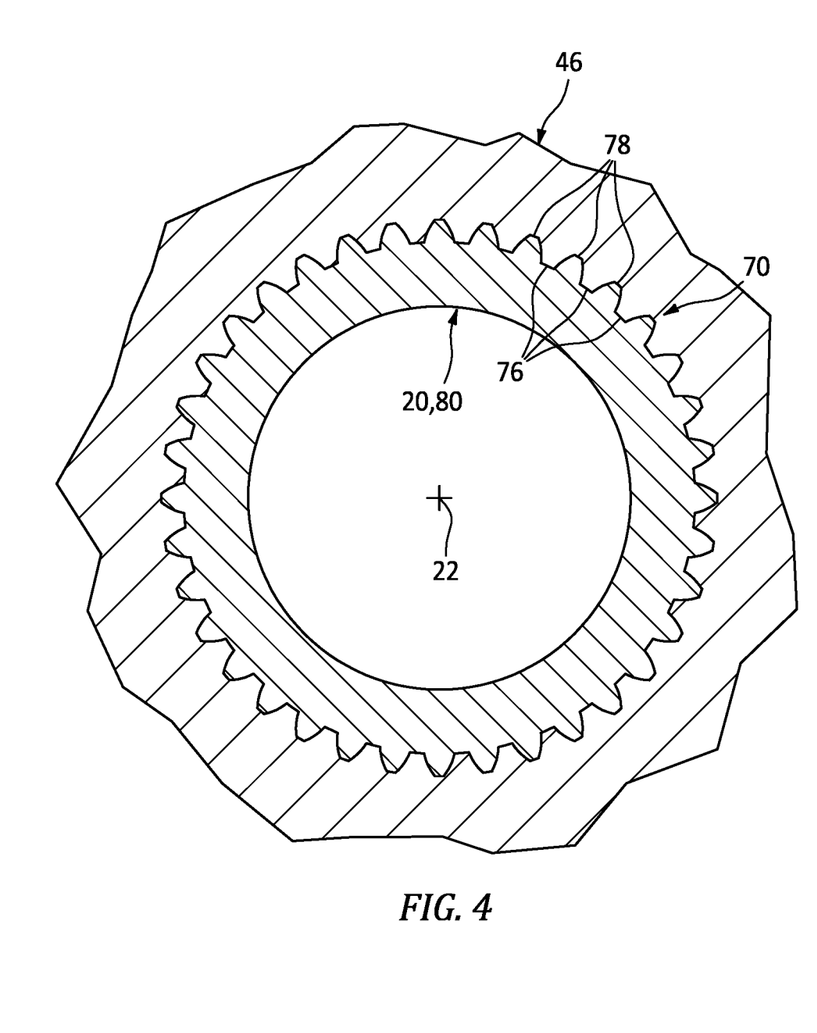
FIG. 4 is a partial cross-sectional illustration of at a spline connection between a gear and the coupler.

The coupler-gear connection 70 of FIG. 1 is configured as a crowned spline connection. The gearbox first gear 46 of FIG. 4, for example, includes a plurality of (e.g., internal) gear splines 76 (e.g., ribs, teeth, etc.), and the component coupler 20 includes a plurality of (e.g., external) second coupler splines 78 (e.g., ribs, teeth, etc.) at the coupler second end 66 of FIG. 1. The gear splines 76 are arranged circumferentially about the rotational axis 22 in an annular array, and the second coupler splines 78 are arranged circumferentially about the rotational axis 22 in an annular array. The gear splines 76 are meshed with the second coupler splines 78. The gear splines 76 of FIG. 2, for example, are interspersed with the second coupler splines 78, and the second coupler splines 78 are interspersed with the gear splines 76. More particularly, each gear spline 76 projects radially (e.g., inward) into a respective second coupler groove in the component coupler 20, where the second coupler groove is formed by and circumferentially between a circumferentially neighboring (e.g., adjacent) pair of the second coupler splines 78. Similarly, each of the second coupler splines 78 projects radially (e.g., outward) into a respective gear groove in the gearbox first gear 46, where the gear groove is formed by and circumferentially between a circumferentially neighboring pair of the gear splines 76. With this arrangement, the component coupler 20 may slightly move (e.g., axially translate) relative to the gearbox first gear 46 during turbine engine operation.

Figure 5A:
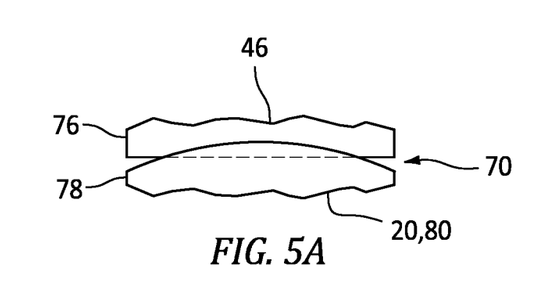
FIGS. 5A-E are partial illustrations of various arrangements for the spline connection between the gear and the coupler.
Figure 5B:
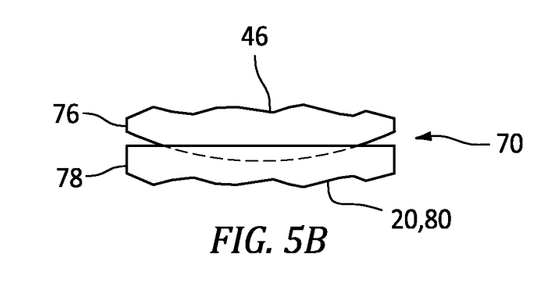
Figure 5C:
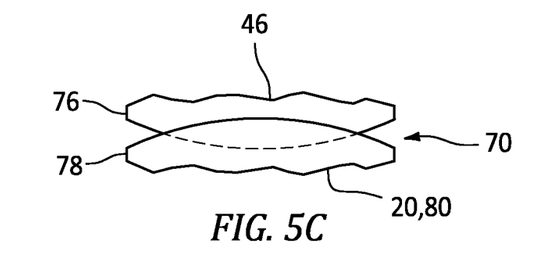
Figure 5D:
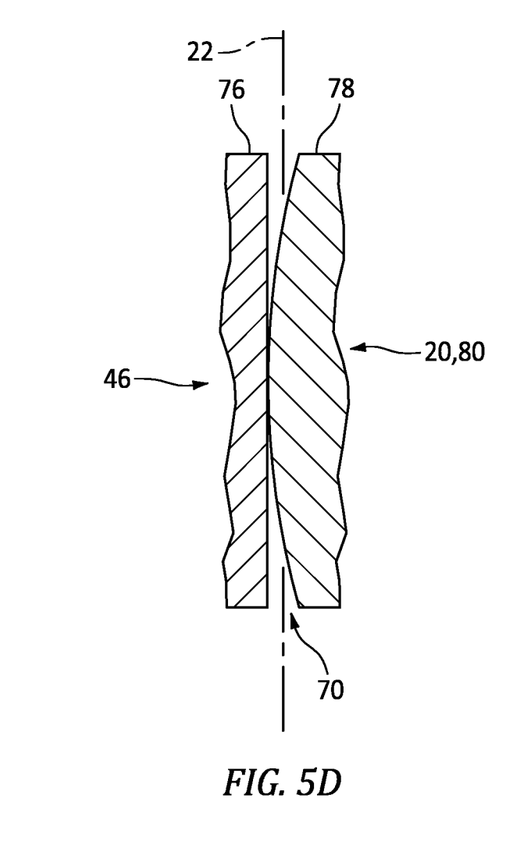
Figure 5E:
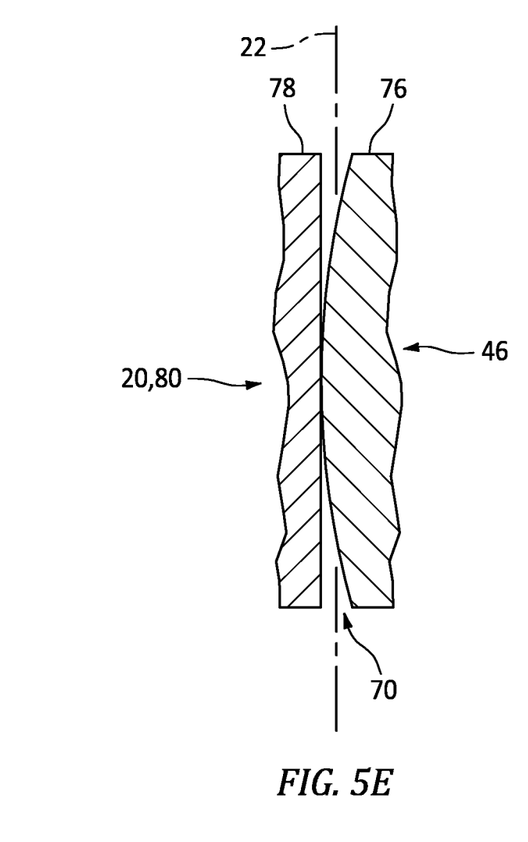

The crowned spline connection FIG. 5A is configured as a single crowned spline connection where the second coupler splines 78 are crowned splines and the gear splines 76 are non-crowned (e.g., rectangular, straight) splines. Each second coupler spline 78 of FIG. 5A, for example, has a convex (e.g., curved, arcuate, etc.) tip profile when viewed, for example, in the reference plane. Each gear spline 76 of FIG. 5A, by contrast, has a straight tip profile when viewed, for example, in the reference plane. In other embodiments however, referring to FIG. 5B, the gear splines 76 may be crowned splines and the second coupler splines 78 may be non-crowned (e.g., rectangular, straight) splines. In still other embodiments, referring to FIG. 5C, the crowned spline connection may be configured as a double crowned spline connection where both the second coupler splines 78 and the gear splines 76 are crowned splines. In addition to or as an alternative to the profiles of FIGS. 5A-C, each of the splines 78 of FIG. 5D has a convex (e.g., curved, arcuate, etc.) flank side profile when viewed, for example, in the second reference plane. Each of the splines 76 of FIG. 5D, by contrast, may be configured with a straight flank side profile when viewed, for example, in the second reference plane. In another example, each of the splines 76 of FIG. 5E has a convex (e.g., curved, arcuate, etc.) flank side profile when viewed, for example, in the second reference plane. Each of the splines 78 of FIG. 5E, by contrast, may be configured with a straight flank side profile when viewed, for example, in the second reference plane.

The crowned spline connections of FIGS. 5A-E may accommodate additional (e.g., more than just axial) movement between the component coupler 20 and the gearbox first gear 46 of FIG. 1. The crowned spline connections of FIGS. 5A-E, for example, may accommodate slight axial mis-alignment (e.g., pivoting) between the component coupler 20 and the gearbox first gear 46 of FIG. 1. The component coupler 20 of FIG. 1 may thereby accommodate various operational shifts between the rotating structure 12 and the turbine engine apparatus 18 during turbine engine operation where, for example, an axial centerline of the turbine engine shaft 26 may become momentarily angularly offset from an axial centerline of the gearbox 36.

Figure 6:
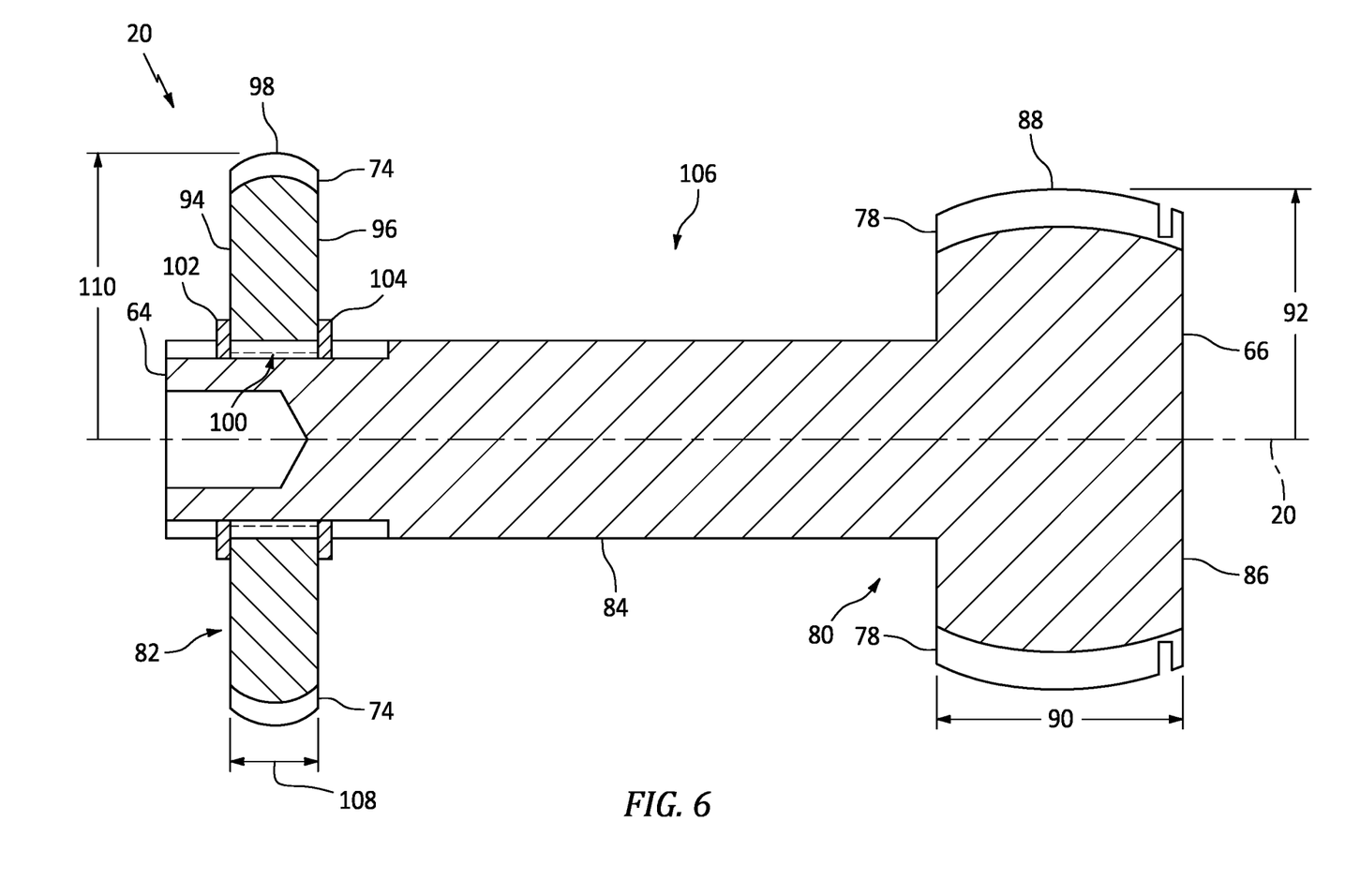
FIG. 6 is a sectional illustration of the coupler.

Referring to FIG. 6, the component coupler 20 may be configured with a dumbbell configuration. The component coupler 20 of FIG. 6, for example, includes a splined shaft 80 and a splined element 82 attached (e.g., removably mounted) to the splined shaft 80.

The splined shaft 80 of FIG. 6 includes a shaft base 84 and a shaft rim 86; e.g., an annular flange. The shaft base 84 extends axially along the rotational axis 22 between and to the coupler first end 64 and the coupler second end 66. The shaft rim 86 is connected to the shaft base 84 and disposed at the coupler second end 66. The shaft rim 86 projects radially out from the shaft base 84 to an outer periphery 88 of the shaft rim 86. The shaft rim 86 includes/forms the second coupler splines 78. These second coupler splines 78 are arranged circumferentially about the shaft rim 86/the rotational axis 22 at the rim outer periphery 88. The second coupler splines 78 of FIG. 6 thereby form the rim outer periphery 88 of the shaft rim 86.

The shaft rim 86 and/or its second coupler splines 78 have a rim width 90 along the rotational axis 22. The rim outer periphery 88 has a (e.g., maximum) rim radius 92 at, for example, an apex of the second coupler splines 78.

The splined element 82 may be configured as an annular body. The splined element 82 of FIG. 6, for example, extends axially along the rotational axis 22 between and to opposing sides 94 and 96 of the splined element 82. The splined element 82 extends radially between and to an inner periphery of the splined element 82 and an outer periphery 98 of the splined element 82. The splined element 82 extends circumferentially about (e.g., completely around) the rotational axis 22.

The shaft base 84 of FIG. 6 projects axially through (or into) a bore of the splined element 82. This splined element 82 may be rotationally fixed to the splined shaft 80 by a spline connection 100; e.g., a straight-spline connection. The splined element 82 may be axially fixed to the splined shaft 80 by, for example, one or more retainers 102 and 104; e.g., split rings. Each retainer 102, 104, for example, is disposed within a respective receptacle (e.g., groove, notch, etc.) in the shaft base 84 axially adjacent a respective side 94, 96 of the splined element 82.

When attached to the splined shaft 80 and its shaft base 84, the splined element 82 projects radially out from the shaft base 84 to its element outer periphery 98. The splined element 82 includes/forms the first coupler splines 74. These first coupler splines 74 are arranged circumferentially about the splined element 82/the rotational axis 22 at the element outer periphery 98. The first coupler splines 74 of FIG. 6 thereby form the element outer periphery 98 of the splined element 82.

The splined element 82 of FIG. 6 is spaced axially from the shaft rim 86. The component coupler 20 is thereby configured with an annular channel 106. This annular channel 106 project radially into the component coupler 20 to the shaft base 84. The annular channel 106 extends axially along the rotational axis 22 within the component coupler 20 between and to the splined element 82 and the shaft rim 86. The annular channel 106 extends circumferentially about (e.g., completely around) the rotational axis 22 through the component coupler 20.

The splined element 82 and/or its first coupler splines 74 have an element width 108 along the rotational axis 22. This element width 108 may be sized different (e.g., less) than the rim width 90. The element outer periphery 98 has a (e.g., maximum) element radius 110 at, for example, an apex of the first coupler splines 74. This element radius 110 may be sized different (e.g., greater) than the rim radius 92. The present disclosure, however, is not limited to such an exemplary dimensional arrangement. For example, in other embodiments, the element width 108 may be equal to the rim width 90 and/or the element radius 110 may be equal to the rim radius 92. Furthermore, while the splined element 82 is described above as including/forming the first coupler splines 74 and the splined shaft 80 is described as including/forming the second coupler splines 78, the component coupler 20 may be reoriented in other embodiments such that the splined element 82 includes/forms the second coupler splines 78 and the splined shaft 80 includes/forms the first coupler splines 74.

Figure 7:
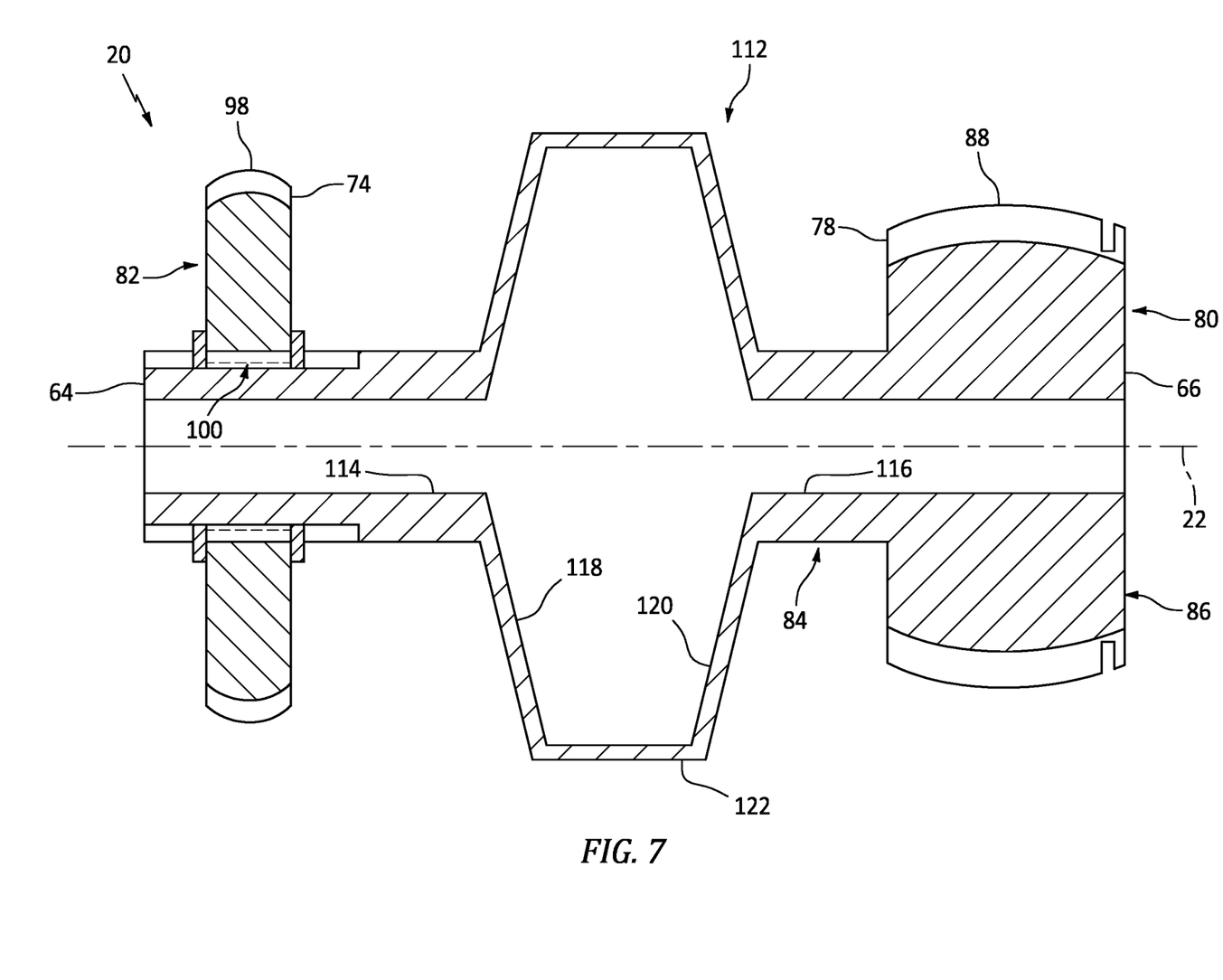
FIG. 7 is a sectional illustration of the coupler configured with a flexible coupling.

In some embodiments, referring to FIG. 7, the component coupler 20 may be configured with a flexible coupling 112; e.g., a flex mount. The shaft base 84 of FIG. 7, for example, includes a first section 114 of the shaft base 84, a second section 116 of the shaft base 84 and the flexible coupling 112. The base first section 114 extends axially to the coupler first end 64 and is coupled to the splined element 82. The base second section 116 extends axially to the coupler second end 66 is connected to the shaft rim 86.

The flexible coupling 112 of FIG. 7 is configured to provide a flexible connection between the base first section 114 and the base second section 116. The flexible coupling 112 of FIG. 7, for example, is arranged between and connects the base first section 114 and base second section 116. This flexible coupling 112 includes a first diaphragm 118, a second diaphragm 120 and a bridge 122. The first diaphragm 118 is connected to the base first section 114 and the bridge 122. This first diaphragm 118 extends radially outward (or inward) from the base first section 114 to the bridge 122. The second diaphragm 120 is connected to the base second section 116 and the bridge 122. This second diaphragm 120 extends radially outward (or inward) from the base second section 116 to the bridge 122. The bridge 122 extends axially along the rotational axis 22 between and to the first diaphragm 118 and the second diaphragm 120. With this arrangement, the first diaphragm 118 and/or the second diaphragm 120 may facilitate slight axial shifts and/or slight pivoting between the base first section 114 and the base second section 116. The flexible coupling 112 may thereby accommodate further operational shifts between the gearbox 36 and the turbine engine shaft 26 of FIG. 1.

Figure 8:
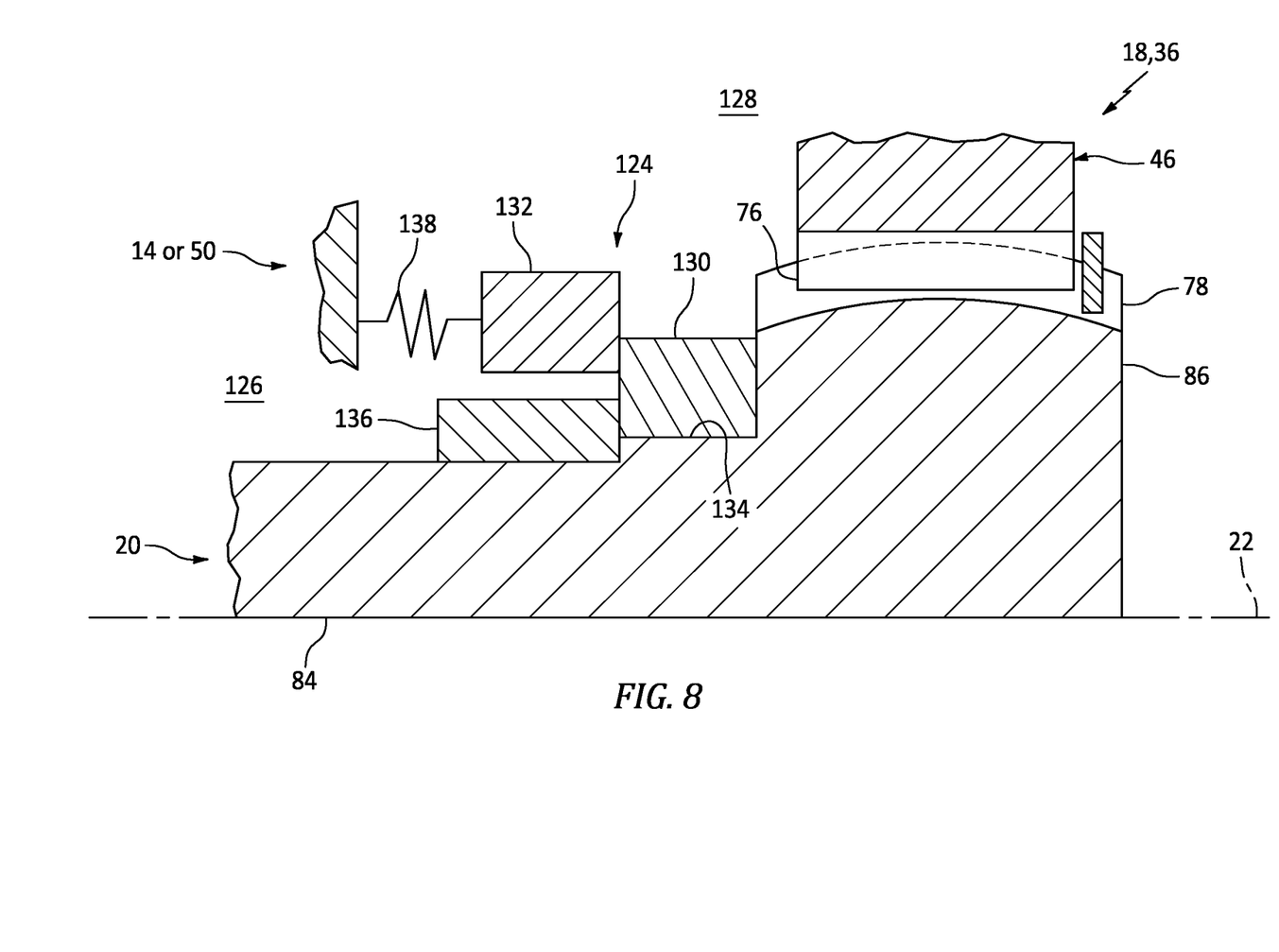
FIG. 8 is a partial sectional illustration of a seal assembly configured with the turbine engine assembly.

In some embodiments, referring to FIG. 8, the turbine engine assembly 10 may also include a seal assembly 124 configured to seal an annular gap between the component coupler 20 and the stationary structure 14, or alternatively another component connected to the stationary structure 14 such as, but not limited to, the gearbox case 50. The seal assembly 124 may thereby fluidly isolate a first compartment 126 (e.g., a bearing compartment) within the turbine engine from a second compartment 128 (e.g., a gearbox compartment) within the turbine engine and, for example, its gearbox 36.

The seal assembly 124 of FIG. 8 includes an annular seal land 130 and an annular seal element 132; e.g., a carbon seal element. The seal land 130 is connected (e.g., removably mounted) to the component coupler 20. The seal land 130 of FIG. 8, for example, is mounted to and circumscribes a shelf portion 134 of the shaft base 84 axially adjacent the shaft rim 86. This seal land 130 may be clamped onto the splined shaft 80 using a nut 136. The seal land 130 and the nut 136 may be installed with and removed from the splined shaft 80 where the splined element 82 of FIG. 6 is removed from/uninstalled with the splined shaft 80.

The seal element 132 of FIG. 8 is connected (e.g., spring mounted) to the stationary structure 14 or the gearbox case 50 via a biasing device 138; e.g., a spring. The biasing device 138 is configured to bias (e.g., push) the seal element 132 against the seal land 130 to maintain sealing engagement between the seal assembly components 130 and 132.

Figure 9:
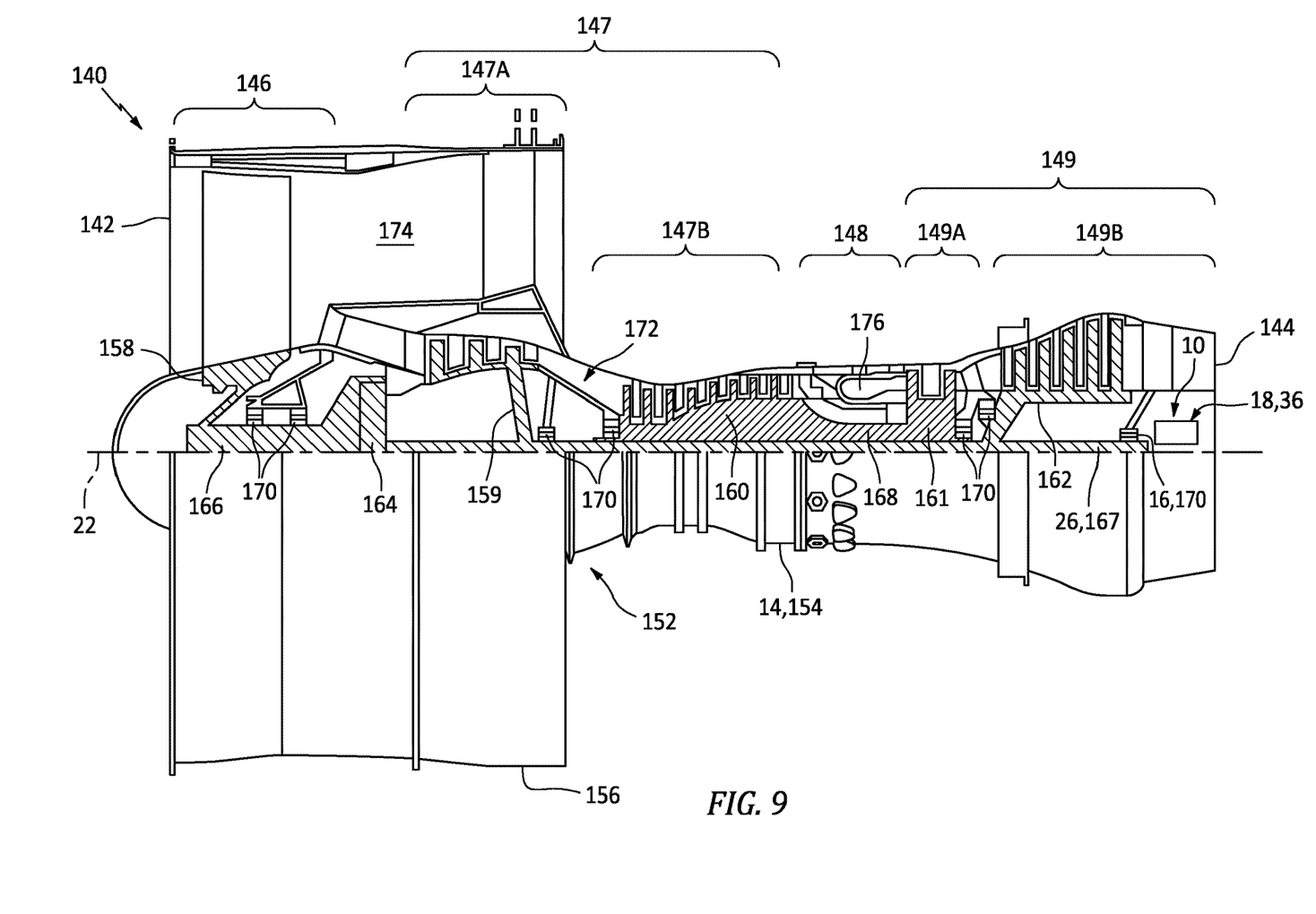
FIG. 9 is a side cutaway illustration of a geared turbofan gas turbine engine.

FIG. 9 illustrates an example of the turbine engine with which the turbine engine assembly 10 may be configured. This turbine engine is configured as a geared, turbofan gas turbine engine 140. This turbine engine 140 extends along the rotational axis 22 between an upstream airflow inlet 142 and a downstream airflow exhaust 144. The turbine engine 140 includes a fan section 146, a compressor section 147, a combustor section 148 and a turbine section 149. The compressor section 147 includes a low pressure compressor (LPC) section 147A and a high pressure compressor (HPC) section 147B. The turbine section 149 includes a high pressure turbine (HPT) section 149A and a low pressure turbine (LPT) section 149B.

The engine sections 146-149B are arranged sequentially along the rotational axis 22 within an engine housing 152. This engine housing 152 includes an inner case 154 (e.g., a core case) and an outer case 156 (e.g., a fan case). The inner case 154 may house one or more of the engine sections 147A-149B (e.g., an engine core) as well as the turbine engine apparatus 18. The outer case 156 may house at least the fan section 146.

Each of the engine sections 146, 147A, 147B, 149A and 149B includes a respective bladed rotor 158-162. Each of these bladed rotors 158-162 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 158 is connected to a gear train 164, for example, through a fan shaft 166. The gear train 164 and the LPC rotor 159 are connected to and driven by the LPT rotor 162 through a low speed shaft 167. The HPC rotor 160 is connected to and driven by the HPT rotor 161 through a high speed shaft 168. The shafts 166-168 are rotatably supported by a plurality of bearings 170; e.g., rolling element bearings. Each of these bearings 170 is connected to the engine housing 152 by, for example, an annular support strut.

During operation, air enters the turbine engine 140 through the airflow inlet 142. This air is directed through the fan section 146 and into a core flowpath 172 and a bypass flowpath 174. The core flowpath 172 extends sequentially through the engine sections 147A-149B. The air within the core flowpath 172 may be referred to as "core air". The bypass flowpath 174 extends through a bypass duct, which bypasses the engine core. The air within the bypass flowpath 174 may be referred to as "bypass air".

The core air is compressed by the LPC rotor 159 and the HPC rotor 160 and directed into a combustion chamber 176 of a combustor in the combustor section 148. Fuel is injected into the combustion chamber 176 and mixed with the compressed core air to provide a fuel-air mixture. This fuel air mixture is ignited and combustion products thereof flow through and sequentially cause the HPT rotor 161 and the LPT rotor 162 to rotate. The rotation of the HPT rotor 161 and the LPT rotor 162 respectively drive rotation of the HPC rotor 160 and the LPC rotor 159 and, thus, compression of the air received from a core airflow inlet. The rotation of the LPT rotor 162 also drives rotation of the fan rotor 158, which propels bypass air through and out of the bypass flowpath 174. The propulsion of the bypass air may account for a majority of thrust generated by the turbine engine 140, e.g., more than seventy-five percent (75%) of engine thrust. The turbine engine of the present disclosure, however, is not limited to the foregoing exemplary thrust ratio.

The turbine engine assembly 10 may be configured at various different locations within the turbine engine 140. For example, the turbine engine assembly 10 and its turbine engine apparatus 18 may be housed within the engine housing 152 and, more particularly, the inner case 154. The stationary structure 14, for example, may be or otherwise include the inner case 154. The turbine engine apparatus 18 may also be disposed radially inboard of the core flowpath 172, where the core flowpath 172 axially overlaps and extends circumferentially about (e.g., completely around, circumscribes) the turbine engine apparatus 18. For example, the turbine engine apparatus 18 may be arranged with/axially aligned with the turbine section 149, where the turbine engine shaft 26 may be one of the shafts 166-168 (e.g., 167) and the structure bearing 16 may be a respective one of the bearings 170 supporting the respective shaft. The present disclosure, however, is not limited to such an exemplary arrangement. For example, in other embodiments, the turbine engine assembly 10 and its turbine engine apparatus 18 may also or alternatively be arranged with/aligned with another one or more sections 146, 147 and/or 148 of the turbine engine 140.

The gearbox 36 of FIG. 1 is described above as being paired with the electric machine 34. However, in other embodiments, the electric machine 34 may be omitted (or arranged discrete from the gearbox 36) and the gearbox 36 may be coupled with one or more other rotating components/structures within the turbine engine 140 of FIG. 9. For example, the gearbox 36 may alternatively be configured as the gear train 164.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a direct drive turbine engine configured without a gear train. The turbine engine assembly 10 may be included in a turbine engine configured with a single spool, with two spools (e.g., see FIG. 9), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a turbine engine shaft configured to rotate about a rotational axis;
a gearbox comprising a gear configured to rotate about the rotational axis; and
a coupler coupled to the turbine engine shaft by a coupler-shaft connection, the coupler-shaft connection comprising a crowned spline connection, and the coupler coupled to the gear by a coupler-gear connection, and the coupler-gear connection comprising a crowned spline connection;
the coupler including a splined shaft and a splined element attached to the splined shaft, the splined shaft coupled to the gear by the coupler-gear connection, and the splined element coupled to the turbine engine shaft by the coupler-shaft connection; and
the splined shaft comprising a base and a rim that projects radially out from and circumscribes the base, the rim coupled to the gear by the coupler-gear connection, and the base projecting through a bore of the splined element.

2. The assembly of claim 1, wherein
the turbine engine shaft includes a plurality of shaft splines; and
the coupler includes a plurality of crowned coupler splines meshed with the plurality of shaft splines.

3. The assembly of claim 1, wherein
the gear includes a plurality of gear splines; and
the coupler includes a plurality of crowned coupler splines meshed with the plurality of gear splines.

4. The assembly of claim 1, wherein the splined element is attached to the splined shaft by an element-shaft connection, and the element-shaft connection comprises a spline connection.

5. The assembly of claim 1, wherein the coupler comprises a flexible coupling disposed axially between the coupler-shaft connection and the coupler-gear connection.

6. The assembly of claim 1, further comprising a bladed turbine rotor connected to the turbine engine shaft.

7. The assembly of claim 1, further comprising a bladed compressor rotor connected to the turbine engine shaft.

8. The assembly of claim 1, further comprising
an electric machine including a rotor and a stator;
the gearbox coupling the coupler with the rotor.

9. The assembly of claim 8, wherein the electric machine is configurable as at least one of a motor during a motor mode of operation; or
a generator during a generator mode of operation.

10. The assembly of claim 1, further comprising:
a compressor section, a combustor section, a turbine section and a flowpath extending sequentially through the compressor section, the combustor section and the turbine section;
the gearbox radially inboard of the flowpath.

11. An assembly for a turbine engine, comprising:
a turbine engine shaft configured to rotate about a rotational axis;
a gearbox comprising a gear configured to rotate about the rotational axis; and
a coupler coupled to the turbine engine shaft by a coupler-shaft connection, the coupler-shaft connection comprising a crowned spline connection, and the coupler coupled to the gear by a coupler-gear connection, the coupler-gear connection comprising a crowned spline connection, the coupler including a splined shaft and a splined element attached to the splined shaft, the splined shaft coupled to the gear by the coupler-gear connection, and the splined element coupled to the turbine engine shaft by the coupler-shaft connection; and
a seal assembly including a seal land and a seal element;
the seal land mounted on the splined shaft and disposed axially between the coupler-shaft connection and the coupler-gear connection; and the seal element arranged with a case of the gearbox.

12. The assembly of claim 11, wherein the coupler comprises a flexible coupling disposed axially between the coupler-shaft connection and the coupler-gear connection.

13. The assembly of claim 11, further comprising a bladed turbine rotor connected to the turbine engine shaft.

14. The assembly of claim 11, further comprising a bladed compressor rotor connected to the turbine engine shaft.

15. The assembly of claim 11, further comprising
an electric machine including a rotor and a stator;
the gearbox coupling the coupler with the rotor.

16. The assembly of claim 15, wherein the electric machine is configurable as at least one of
a motor during a motor mode of operation; or
a generator during a generator mode of operation.

17. The assembly of claim 11, further comprising:
a compressor section, a combustor section, a turbine section and a flowpath extending sequentially through the compressor section, the combustor section and the turbine section;
the gearbox radially inboard of the flowpath.

18. An assembly for a turbine engine, comprising:
a splined shaft including a base and a rim, the base extending axially along a rotational axis between a first end and a second end, the rim disposed at the second end and projecting radially out from the base, and the rim including a plurality of second crowned splines arranged circumferentially about the rotational axis at an outer periphery of the rim; and
a splined element coupled to the base by a splined connection, the splined element disposed at the first end, the splined element including a plurality of first crowned splines arranged circumferentially about the rotational axis at an outer periphery of the splined element, and the splined element axially spaced from the rim; and
a seal land mounted to the splined shaft axially between the rim and the splined element.

19. The assembly of claim 18, further comprising a plurality of retainers axially fixing the splined element to the base.

20. The assembly of claim 18, wherein a radius of the outer periphery of the rim is different than a radius of the outer periphery of the splined element.

\* \* \* \* \*